United States Patent Office 2,786,077
Patented Mar. 19, 1957

2,786,077

DESDIMETHYLAMINOTETRACYCLINES AND PROCESS

Charles R. Stephens, Jr., Waterford, Conn., assignor to Chas. Pfizer & Co., Inc., Brooklyn, N. Y., a corporation of Delaware No Drawing. Application October 22, 1954, Serial No. 464,170

6 Claims. (Cl. 260—559)

This invention is concerned with certain biologically active products and with a process for their preparation. In particular it is concerned with a group of polycyclic, polyoxygenated compounds.

In an earlier co-pending patent application, Serial Number 313,981, filed October 9, 1952 (now abandoned), there is described the preparation of a compound identified as desdimethylaminoterramycin, which is herein designated as desdimethylaminooxytetracycline. This product is prepared by treating the antibiotic oxytetracycline (Terramycin) with zinc in a mildly acidic medium. The biologically active product is produced in the form of a complex with zinc from which it may be isolated. Similarly it was shown in the co-pending patent application, Serial Number 315,428, filed on October 17, 1952 (also now abandoned), that the structurally closely related antibiotic chlortetracycline (Aureomycin) may in the same manner be converted to a compound therein identified as desdimethylaminoaureomycin, and now known as desdimethylaminochlortetracycline.

It has now been found that the method described above is a general method for the removal of the dimethylamino group from a series of polyoxygenated, polycyclic antibiotic compounds to yield products which also possess a high level of antibiotic activity.

The present application is a continuation-in-part of the above identified earlier filed applications. The present application is concerned with the general reaction which may be represented as follows:

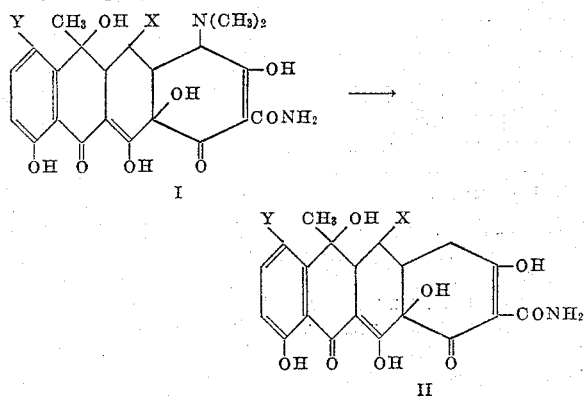

wherein Y is H when X is H, or OH, and Y is Cl when X is H. The formula designated above as II represents the desdimethylamino products obtained by the present general reaction. These are biologically active, possessing an appreciable activity against a variety of gram-positive and gram-negative microorganisms. They are also useful for the stimulation of plant or animal growth. The substances represented by Formula II above may exist as either the free compounds or as salts with certain strongly basic substances such as the alkali metals and the alkaline earth metals. The new compounds also form complexes with various polyvalent metallic salts such as calcium chloride, magnesium chloride, cobalt chloride, ferric chloride, nickel chloride, strontium bromide, etc. The products of the present invention may be designated by the general term "desdimethylaminotetracycline compounds." This term includes not only the substances themselves, but also their salts and metallic salt complexes, both in crude and purified form.

Each of the three compounds, chlortetracycline, oxytetracycline, and tetracycline, is referred to herein as "a tetracycline antibiotic." By this we mean a biologically active compound having the structure given as I above wherein Y and X vary in nature. In the case of chlortetracycline Y is Cl and X is H, and so forth.

The new products of this invention may be prepared from the corresponding dimethylamino containing substances such as tetracycline, oxytetracycline and chlortetracycline, which may be used in the form of free compounds or salts with metals or acids. Salts which are useful include the hydrochlorides, the hydrobromides, and the sodium, potassium and calcium salts. As indicated above the conversion is carried out by contacting the antibiotic with zinc in a mildly acidic medium. By this we mean an anhydrous lower aliphatic carboxylic acid, having substantially between one and three carbon atoms, or a dilute aqueous or aqueous-alcohol solution of a mineral acid. Of particular value is the use of glacial acetic acid as the medium, but a solution of a mineral acid, for instance, having a concentration not greater than about 5% is also of considerable value in the present process. The rate at which the desired products are formed according to this process may vary appreciably with the medium used. However, it is relatively simple to determine the optimum time for any given set of conditions and for any particular mildly acidic medium. This may be done by making small scale trial runs and isolating the product to determine its yield and purity.

When the zinc-acetic acid system is used with an acid salt form of a tetracycline antibiotic, addition to the reaction mixture of a minor proportion of an acetic acid soluble basic material such as sodium acetate, calcium acetate or other alkali metal acetate assists in accelerating the reaction. In general, it is best to operate at a temperature of from about 0° C. to about 40° C. In fact, the reaction may be run quite satisfactorily at about room temperature, that is from about 20° C. to about 25° C. The stability of the product formed in the reaction mixture will vary somewhat with the acid medium used. In highly acidic media, and particularly at elevated temperatures, the rate of decomposition of the product is appreciably increased. Optimum conditions may, as indicated above, be determined by small scale tests.

In general, a period of from about 2 to about 10 hours is usually sufficient to bring the present novel reaction to a reasonable stage of completion. A concentration of from about 1 to about 20% by weight of tetracycline antibiotic in the acidic medium is satisfactory for the reaction. The zinc used for the reaction should preferably be in finely divided form, for instance, zinc dust, and this metal should be used to an extent of at least ½ part by weight of the metal per part by weight of the antibiotic. More suitably two to five parts by weight may be used. A proportion of zinc higher than about ten parts by weight is not necessary.

When the reaction is run in an aqueous medium, that is with a dilute mineral acid, the product may be extracted directly into a water-immiscible stable organic solvent in which the product has appreciable solubility. Lower aliphatic ethers such as dimethyl ether and halogenated lower hydrocarbons, e. g. chloroform and methylene chloride are particularly useful for this purpose. After the addition of the metallic zinc, which is favorably made in portions, has been completed, the organic solvent may be added to the aqueous solution and the product, that is, the desdimethylamino compound, may be extracted continuously into the solvent as it is formed by the reaction. The mixture should be agitated or means should be provided for maintaining intimate contact between the two phases.

When acetic acid is used as the medium, the reaction product may be recovered by several different procedures. Any residual zinc is first removed, for instance, by filtration. Addition of water to the filtrate causes the precipitation of a crude desdimethylaminotetracycline antibiotic. Alternatively the solvent (acetic acid) may be removed by evaporation at a low temperature or by freezing the mixture and drying from the frozen state under vacuum. The yellow product thus obtained often contains an appreciable proportion of the product in the form of a zinc complex. By dissolving this material, which is useful of itself, in a lower aliphatic alcohol, preferably methanol, with the addition of a strong mineral acid (e. g. hydrochloric acid, sulfuric acid, phosphoric acid, hydrobromic acid, etc.) and then adding water, a solid product separates. This may be extracted into a water-immiscible non-polar solvent to obtain a purified solution of the product. Diethyl ether is particularly useful. Traces of impurities are removed by washing the solution with a small volume of water. Evaporation of the ether solution results in the formation of an amorphous product of quite high purity. When this material is rubbed under methanol, it crystallizes, often as a solvate with methanol.

An alternative method of obtaining the crystalline product is to treat a lower alcoholic solution of the zinc-containing complex obtained as described above with a strong mineral acid, particularly hydrochloric acid, without the addition of excess water. The product then crystallizes directly from the methanol solution. This crystallization is generally complete in a few hours.

A sample of crystalline methanol solvate of desdimethylaminochlortetracycline was analyzed and found to contain the following proportions of elements:

| | Percent by weight |
|---|---|
| Carbon | 54.1 |
| Hydrogen | 4.95 |
| Nitrogen | 3.12 |
| OCH$_3$ | 6.24 |
| Chlorine | 7.58 |
| Oxygen (by difference) | 24.01 |

Analysis calculated for $C_{20}H_{18}NO_8Cl \cdot CH_3OH$: C, 53.91; H, 4.72; N, 2.99; Cl, 7.57; OCH$_3$, 6.62.

The crystalline methanol solvate has a melting point of about 155–160° C. A solution of it (one percent in dimethylformamide) has an optical rotation of $$[\alpha]_d^{25} = -305°$$

The product displays adsorption maxima in the ultraviolet when dissolved in ethanol (.01-Normal in hydrochloric acid) at 230 (log ε 4.28), 257 (log ε 4.23), and 373 (log ε 4.13) mμ. The crystalline product displays weakly acidic groups having pKa values of 7.4 and 8.9, respectively. This determination was made in a solvent consisting of 50% dimethylformamide and 50% water.

When the desdimethylamino compound of tetracycline is prepared in glacial acetic acid, it too is obtained as a zinc complex which, upon treatment with acid yields the microbiologically active product itself. This product has the following structure:

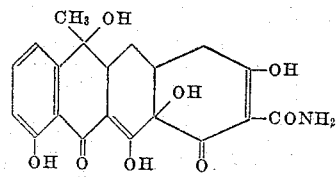

It is obtained as a yellow, crystalline product after treatment of the zinc complex originally obtained by treatment of tetracycline in acetic acid with zinc. The crystalline zinc-free product has the following physical properties: Melting point 170–175° C. (with decomposition). Ultraviolet absorption maxima in methanol —0.01 N in hydrochloric acid: 222 mμ (log ε 4.18), 264 mμ (log ε 4.21) and 363 mμ (log ε 4.16). Ultraviolet absorption in methanol, 0.01 in sodium hydroxide: 269 mμ (log ε 4.24), 377 mμ (log ε 4.21).

The crystalline desdimethylamino product is obtained from oxytetracycline by the same process. It melts at about 217° to 218° C., with decomposition. The product when dissolved in methanol at a concentration of 1% has an optical rotation of about —137°. In 1% acetone solution the compound has a rotation of +47°. In 50% methanol 50% water solution the compound displays two acidic groups with pKa values of 6.9 and 8.8. Analysis of the crystalline product has given the following figures:

| | Percent |
|---|---|
| Carbon | 57.42 |
| Hydrogen | 4.62 |
| Nitrogen | 3.34 |

Calculated for $C_{20}H_{19}NO_9$: C, 57.55; H, 4.59; N, 3.36.

In the following table is given the microbiological activity of three of these new compounds, that is desdimethylaminooxytetracycline, desdimethylaminochlortetracycline, and desdimethylaminotetracycline against a variety of microorganisms.

| Microorganism | Minimum Inhibitory Concentration | | |
|---|---|---|---|
| | Desdimethylaminooxytetracycline, mcg./ml. | Desdimethylaminochlortetracycline, mcg./ml. | Desdimethylaminotetracycline, mcg./ml. |
| A. aerogenes* AC2 | 6.25 | 3.12 | 1.56 |
| A. aerogenes* MT2 | 0.78 | 0.19 | 1.56 |
| A. aerogenes (parent) | 25 | 12.5 | 12.5 |
| E. coli | 50 | 6.25 | 12.5 |
| Proteus | 25 | 12.5 | 25 |
| Ps. aeruginosa | 25 | 25 | 25 |
| Sal. typhosa | 12.5 | 6.25 | 25 |
| K. pneumoniae | 6.25 | 3.12 | 6.25 |
| Sal. paratyphi A | 12.5 | 6.25 | 12.5 |
| Sal. paratyphi B | 6.25 | 25 | 25 |
| B. subtilis | 0.19 | 25 | 0.39 |
| Staph. aureus | 1.56 | 6.25 | 6.25 |
| Str. faecalis | 3.12 | 6.25 | 3.12 |
| Br. bronchiseptica | 1.56 | 0.19 | 0.19 |
| Candida albicans | 100 | 100 | 100 |
| Mycobacterium ranae | 0.19 | 1.56 | 1.56 |
| Mycobacterium smegmatis | | 3.12 | .39 |
| Mycobacterium phlei | 0.39 | 0.19 | .78 |
| Mycobacterium No. 607 | 0.19 | 1.56 | .78 |
| Mycobacterium buryricum | 0.19 | 1.56 | .39 |
| Mycobacterium berolinense | | 0.78 | .39 |

*Resistant strains.

It should be noted that the pH of the medium in which these compounds are tested may affect their activity, higher pH's being deleterious. They are however quite active at about neutrality or at the pH of blood.

Toxicity of these products is quite low and they show considerable activity against strains of microorganisms which are resistant to certain other antibiotic compositions. Not only are the substances microbiologically active, but they are stimulatory to animal growth.

The following examples are given by way of illustration, and are not to be considered as the sole embodiments of this invention. It is to be understood that protection hereof is to be limited only by the specific wording of the appended claims.

*Example I*

A mixture of 10 grams of chlortetracycline hydrochloride, 100 milliliters of glacial acetic acid, 2.5 grams of sodium acetate and 20 grams of zinc dust was stirred for six hours at a temperature of 30–32° C. The mixture was then filtered to remove excess zinc and the solution was frozen and dried under vacuum. The bright yellow solid product was treated with 80 milliliters of methanol and then with 11 milliliters of concentrated hydrochloric acid. A clear, bright yellow solution was obtained. When this solution was allowed to stand, crystals of the methanol solvate separated in good yield. However, in some cases, the product was separated directly by the following procedure. About 200 milliliters of water were added and the slurry of solid product was extracted with four portions of ether. The combined ether extracts were washed four times with small volumes of distilled water. The solvent was then removed from the ether solution under vacuum. The amorphous, residual product proved to be quite pure. A portion of this material, when rubbed with methanol, readily crystallized as a methanol solvate whose properties are described above.

Example II

One part by weight of amphoteric chlortetracycline was added to twenty parts of weight of three percent hydrochloric acid. The solution was cooled to about 5° C. and two parts by weight of zinc dust was gradually added over a period of about twenty minutes. The mixture was stirred continuously and a volume of chloroform equal to that of the aqueous solution was added. The mixture was stirred for several hours and the chloroform layer was then separated. The chloroform was removed under vacuum and desdimethylaminochlortetracycline was obtained as a bright yellow powder.

Example III

One part by weight of amphoteric oxytetracycline dihydrate was dissolved in ten volumes of glacial acetic acid. The resulting solution was treated with two parts by weight of zinc dust. This material was added during one hour and at a temperature of about 25° C. The mixture was stirred under nitrogen for about 8 hours. Excess zinc was removed by filtration and the filtrate was evaporated under reduced pressure to dryness. The residue was triturated with water to give a bright yellow amorphous solid. The solid material was dried and extracted repeatedly with ether to remove by-products. The ether-insoluble residue, which is a zinc complex, was then treated with concentrated hydrochloric acid dissolved in methanol. For each four grams of the zinc complex, one milliliter of concentrated hydrochloric acid and 16 milliliters of methanol were used. The resulting solution was clarified by filtration and the filtrate was added to a volume of water four times that of the solution. A yellow product separated. This was filtered and dried. The dried material was extracted repeatedly with ether. The ether extracts were concentrated and the desired product, desdimethylaminooxytetracycline separated from the concentrated solution. It was recrystallized from acetone to obtain a highly purified material.

Example IV

A solution of 20 grams of oxytetracycline hydrochloride in 540 milliliters of two percent aqueous hydrochloric acid was cooled to between 0 and 10° C. The solution was treated by the gradual addition of 30 grams of zinc dust. The mixture was stirred for 30 minutes and 500 milliliters of diethyl ether were then added. For 5½ hours the mixture was stirred at a temperature of from 0 to 10° C. The acid-insoluble biologically active reaction product was extracted into the solvent phase as it was formed. At the end of the 5½ hour period, the ether layer was separated and concentrated to dryness. The residual product was desdimethylaminooxytetracycline. The material was recrystallized from acetone to give a highly purified product.

Example V

Tetracycline was treated just as described for oxytetracycline in Example III above. In this manner was obtained desdimethylaminotetracycline with the properties described above.

What is claimed is:

1. Process for the preparation of a microbiologically active product selected from the group consisting of desdimethylaminotetracycline, desdimethylaminochlortetracycline, and desdimethylamino-4-oxytetracycline which comprises contacting a tetracycline antibiotic selected from the group consisting of tetracycline, chlortetracycline, and oxytetracycline with metallic zinc in a mildly acidic medium at a temperature of from about 0° C. to about 40° C. for a time of from about 2 to about 10 hours, the concentration of tetracycline antibiotic based on the weight of acidic medium being from about 1 to about 20 percent by weight, there being at least ½ part by weight of zinc per part by weight of tetracycline antibiotic, and recovering resulting microbiologically active product.

2. A process as claimed in claim 1 wherein the tetracycline antibiotic is contacted with zinc in an aqueous mineral acid solution having a concentration of not greater than about 5%.

3. A process as claimed in claim 1 wherein the tetracycline antibiotic is contacted with metallic zinc in glacial acetic acid.

4. A biologically active desdimethylaminotetracycline compound chosen from the group consisting of desdimethylaminochlortetracycline and desdimethylaminotetracycline.

5. Desdimethylaminotetracycline.

6. Desdimethylaminochlortetracycline.

References Cited in the file of this patent

UNITED STATES PATENTS 2,482,055    Duggar _____ Sept. 13, 1949

OTHER REFERENCES

Stephens et al.: "JACS," vol. 74, October 5, 1952, pp. 4976–77 (rec'd August 8, 1952).

Pasternack et al.: "JACS," vol. 74, April 20, 1952, pp. 1926–34.

Regna et al.: "Ann. N. Y. Acad. Sci.," vol. 53 (1950), pp. 229–37.

Broschard et al.: "Science," vol. 109 (1949), pp. 199–200.

Dornbush et al.: "Proc. Soc. Exptl. Biol. and Med.," vol. 76, April 1951 (rec'd February 15, 1951), pp. 676–79.

Schoenbach et al.: "Ann. N. Y. Acad. Sci.," November 30, 1948, p. 267.

Pasternack et al.: "J. Am. Chem. Soc.," vol. 73, May 1951, (rec'd April 6, 1951), p. 2400.

Hochstein et al.: "JACS," vol. 73, October 1951 (rec'd September 7, 1951), pp. 5008–9.

Hochstein et al.: "JACS," vol. 74, July 20, 1952, pp. 3706–09 (rec'd June 25, 1952).